(12) United States Patent
Tovey et al.

(10) Patent No.: US 10,643,421 B2
(45) Date of Patent: May 5, 2020

(54) SYSTEM AND METHOD FOR CONTROLLING ONBOARD POWER AND COMMUNICATION SYSTEMS AT AN AUTOMATED LOCKER

(71) Applicant: Walmart Apollo, LLC, Bentonville, AR (US)

(72) Inventors: David G. Tovey, Rogers, AR (US); Todd Mattingly, Bentonville, AR (US); Kurt W. Bessel, Mexico, NY (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/390,573

(22) Filed: Apr. 22, 2019

(65) Prior Publication Data
US 2019/0325692 A1    Oct. 24, 2019

Related U.S. Application Data

(60) Provisional application No. 62/661,128, filed on Apr. 23, 2018.

(51) Int. Cl.
*G07F 17/12*     (2006.01)
*G07C 9/00*      (2020.01)
(Continued)

(52) U.S. Cl.
CPC ......... *G07F 17/12* (2013.01); *G07C 9/00912* (2013.01); *H02J 7/0027* (2013.01); *H02J 7/0042* (2013.01); *H02J 9/061* (2013.01)

(58) Field of Classification Search
CPC ........ H02J 9/061; H02J 7/0042; H02J 7/0027; G07C 9/00912; G07F 17/12; G06Q 10/0836
See application file for complete search history.

(56) References Cited

U.S. PATENT DOCUMENTS

| 6,882,269 B2 | 4/2005 | Moreno |
| 8,854,185 B2 | 10/2014 | Mullin et al. |

(Continued)

FOREIGN PATENT DOCUMENTS

| CN | 104323633 A | 2/2015 |
| CN | 105957275 A | 9/2016 |
| JP | 64-90371 A | 4/1989 |

OTHER PUBLICATIONS

Cleveron AS, "Cleveron Introduction 2016", 2016, pp. 1.
(Continued)

*Primary Examiner* — Nabil H Syed
(74) *Attorney, Agent, or Firm* — Venable LLP; Jeffri A. Kaminski

(57) ABSTRACT

Systems and methods for controlling onboard power and communication systems at an automated locker are provided. An example method can include: autonomously detecting a status of a primary power supply connected to the locker, a communication status between the locker and a central server, an internal server status, and an onboard battery percentage of an onboard power; when the onboard battery percentage is greater than or equal to the predetermined battery percentage, autonomously switching to the onboard power and requesting the internal server to conduct transactions and store transaction data internally; and when the battery percentage of the onboard power is lower than the predetermined battery percentage, shutting down the locker; and when the primary power supply is detected to be reestablished and the locker is in communication with the central server, autonomously requesting the internal server to upload the transaction data to the central server.

20 Claims, 5 Drawing Sheets

(51) Int. Cl.
*H02J 9/06* (2006.01)
*H02J 7/00* (2006.01)

(56) References Cited

U.S. PATENT DOCUMENTS

| | | | |
|---|---|---|---|
| 9,043,217 B2 | 5/2015 | Cashman et al. | |
| 2003/0191741 A1 | 10/2003 | Kurosawa et al. | |
| 2008/0111424 A1* | 5/2008 | Yeh | H02J 1/10 |
| | | | 307/65 |
| 2010/0315197 A1* | 12/2010 | Solomon | G06F 21/31 |
| | | | 340/5.2 |
| 2011/0018342 A1* | 1/2011 | Park | G06F 1/30 |
| | | | 307/23 |
| 2015/0186840 A1 | 7/2015 | Torres et al. | |
| 2015/0311737 A1 | 10/2015 | Park et al. | |
| 2018/0005183 A1* | 1/2018 | Nguyen | G06Q 10/0836 |

OTHER PUBLICATIONS

Ricoh, "Ricoh Intelligent Locker Systems", https://www.youtube.com/watch?v=eewM6-0-Ldo, pp. 1.
Pacific Sky LLC, "SmartSafe Beach Locker",https://www.youtube.com/watch?v=P2uirYyAtFA, 2015, pp. 1.
International Search Report and Written Opinion dated Jul. 16, 2019, in International Application No. PCT/US2019/028507 (13 pages).

* cited by examiner

SYSTEM AND METHOD FOR CONTROLLING ONBOARD POWER AND COMMUNICATION SYSTEMS AT AN AUTOMATED LOCKER

CROSS REFERENCE TO RELATED APPLICATION

This patent application claims the benefit of U.S. Provisional Application No. 62/661,128, filed on Apr. 23, 2018, content of which is incorporated by reference herein.

BACKGROUND

1. Technical Field

The present disclosure relates to onboard power and communication systems at an automated locker, and more specifically to systems and methods for controlling onboard power and communication systems at an automated locker.

2. Introduction

With the fast growth of e-commerce services, more and more customers prefer to place online orders for products via a merchant's e-commerce website using their mobile devices. Automated lockers (e.g. lockers, kiosks) are used for customers to order products and to pick up their online orders. Existing automated lockers normally require a reliable network connection and a central computing system to process transactions. In an event of a primary power supply failure or during a network disconnection, automated lockers with no onboard power and communication systems may no longer be operable. Data transactions between automated lockers and the central computing system may be delayed or canceled. Customers may not be able to pick up their purchased items or place orders at the lockers during power and communication network outages, which also places a burden on the management system to notify affected customers. Therefore, automated lockers with onboard power and communication systems may provide customers more convenient and reliable e-commerce services. What is provided herein are systems and methods for controlling onboard power and communication systems at automated lockers, which may overcome some disadvantages of existing lockers.

SUMMARY

An example system configured for controlling onboard power and communication systems at an automated locker according to the concepts and principles disclosed herein can include: an internal server; an onboard power; an onboard power generation equipment comprising a plurality of photovoltaics solar panels configured to generate a first backup power for charging the onboard power; a controller; a processor; and a non-transitory computer-readable storage medium having instructions stored which, when executed by the processor, cause the processor to perform operations comprising: autonomously detecting, by the controller, a status of a primary power supply connected to the locker, a communication status between the locker and a central server, a status of the internal server, and a battery percentage of the onboard power; when the primary power supply is detected to be interrupted, comparing, by the processor, the battery percentage of the onboard power with a predetermined percentage; when the primary power supply is detected by the controller to be interrupted and when the battery percentage of the onboard power is greater than or equal to the predetermined battery percentage, autonomously switching, by the controller, to the onboard power for supplying a battery power to the locker; requesting, by the processor, the internal server to conduct transactions and store transaction data on the internal server when the communication connection between the locker and the central server is interrupted and when the primary power supply is detected to be interrupted; autonomously controlling, by the controller, the onboard power generation equipment to generate a power for charging the onboard power; when the primary power supply is detected by the controller to be interrupted and when the battery percentage of the onboard power is lower than the predetermined battery percentage, autonomously shutting down the locker by the controller, and when the primary power supply is detected to be reestablished and the locker is in communication with the central server, autonomously requesting, by the processor, the internal server to upload the stored transaction data to the central server.

An example method of performing concepts disclosed herein can include: autonomously detecting, by the controller, a status of a primary power supply connected to the locker, a communication status between the locker and a central server, a status of an internal server, and a battery percentage of an onboard power; when the primary power supply is detected to be interrupted, comparing, by the processor, the battery percentage of the onboard power with a predetermined percentage; when the battery percentage of the onboard power is greater than or equal to the predetermined battery percentage, autonomously switching, by the controller, to the onboard power for supplying a battery power to the locker; requesting, by the processor, the internal server to conduct transactions and store transaction data internally on the internal server when the communication connection between the locker and the central server is interrupted; autonomously controlling, by the controller, the onboard power generation equipment to generate a power for charging the onboard power; when the battery percentage of the onboard power is lower than the predetermined battery percentage, autonomously shutting down the locker by the controller, and when the primary power supply is detected to be reestablished and the locker is in communication with the central server, autonomously requesting, by the processor, the internal server to upload the stored transaction data to the central server.

An example non-transitory computer-readable storage medium configured as disclosed herein can have instructions stored which, when executed by a computing device, cause the computing device to perform operations including: autonomously detecting, by the controller, a status of a primary power supply connected to the locker, a communication status between the locker and a central server, a status of an internal server, and a battery percentage of an onboard power; when the primary power supply is detected to be interrupted, comparing, by the processor, the battery percentage of the onboard power with a predetermined percentage; when the battery percentage of the onboard power is greater than or equal to the predetermined battery percentage, autonomously switching, by the controller, to the onboard power for supplying a battery power to the locker; requesting, by the processor, the internal server to conduct transactions and store transaction data internally on the internal server when the communication connection between the locker and the central server is interrupted; autonomously controlling, by the controller, the onboard power generation equipment to generate a power for charging the onboard power; when the battery percentage of the onboard power is lower than the predetermined battery percentage, autonomously shutting down the locker by the controller, and when the primary power supply is detected to be reestablished and the locker is in communication with the central server, autonomously requesting, by the processor, the internal server to upload the stored transaction data to the central server.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Example embodiments of this disclosure are illustrated by way of an example and not limited in the figures of the accompanying drawings, in which like references indicate similar elements and in which.

Figure 1:
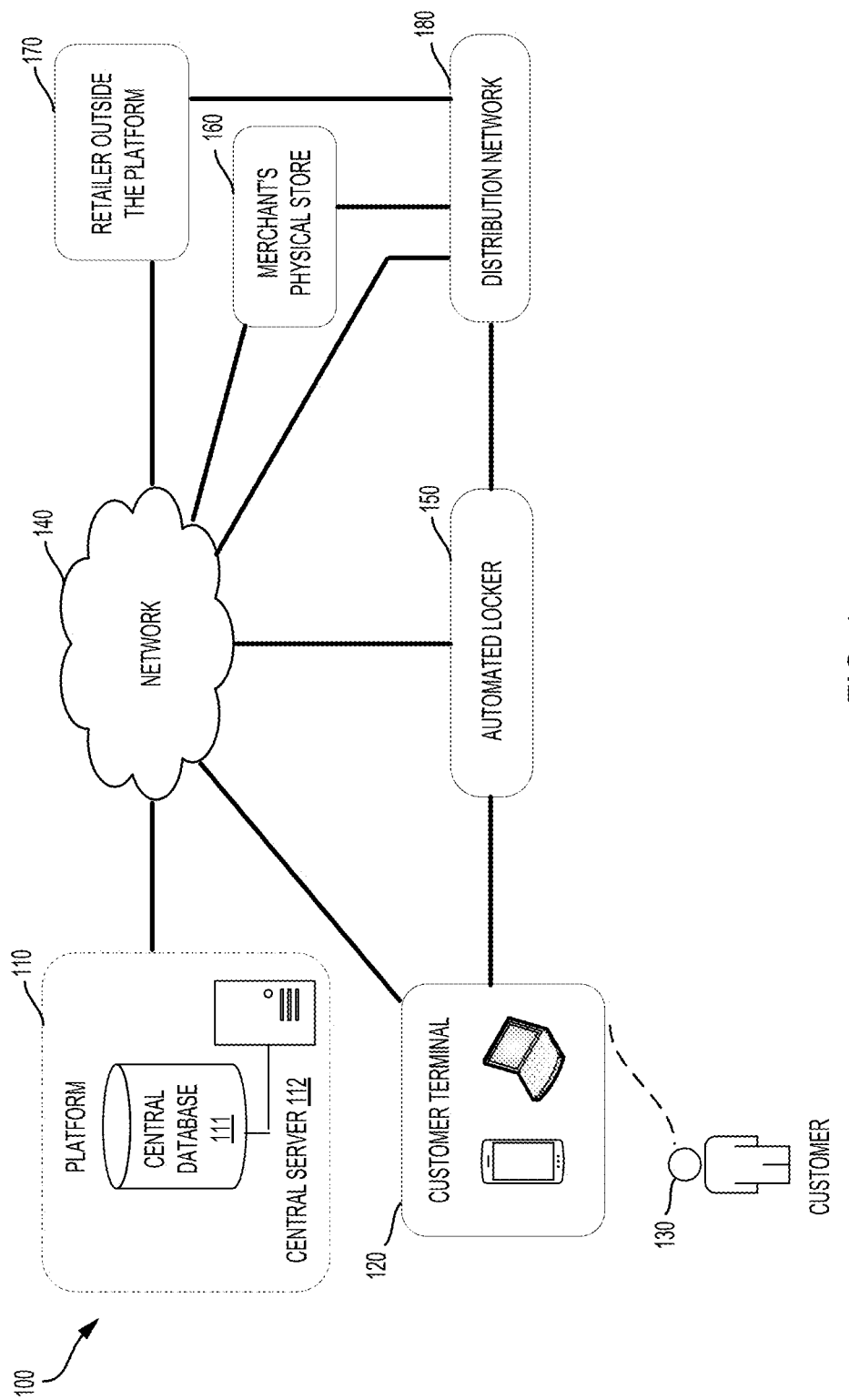
FIG. 1 is a block diagram illustrating an example computing environment in which some example embodiments may be implemented.

It is to be understood that both the foregoing general description and the following detailed description are example and explanatory and are intended to provide further explanations of the invention as claimed only and are, therefore, not intended to necessarily limit the scope of the disclosure.

DETAILED DESCRIPTION

Various example embodiments of the present disclosure will be described in detail below with reference to the accompanying drawings. Throughout the specification, like reference numerals denote like elements having the same or similar functions. While specific implementations and example embodiments are described, it should be understood that this is done for illustration purposes only. Other components and embodiments may be used without parting from the spirit and scope of the disclosure.

Various specific embodiments of the disclosure are described in detail below. While specific implementations are described, it should be understood that this is done for illustration purposes only. Other components and configurations may be used without parting from the spirit and scope of the disclosure, and can be implemented in combinations of the variations provided. These variations shall be described herein as the various embodiments are set forth.

The present disclosure provides a solution for automated lockers to process transaction data with onboard power and communication systems in the event of a power interruption or communication disconnection, which allows for uninterrupted services for customers. Embodiments may allow an automated locker to conduct transactions on its own where power or network communications are uncertain or interrupted. The onboard power and communication system described in the present disclosure may also allow for a deployment of portable systems to supply power and communication to the automated locker in a planned off-grid environment.

For example, in a state of interrupted power or network connectivity, the disclosed automated locker may conduct transactions autonomously and store the transaction data on an internal server until a power or communication connection is reestablished. The internal server may autonomously update the stored transactions to a central server.

FIG. 1 is a block diagram illustrating an example computing environment 100 in which some example embodiments may be implemented. The example computing environment 100 generally includes one or more of platform 110, customer terminal 120, customer 130, network 140, automated locker 150, merchant's physical store 160, retailer outside merchant's platform 170, and distribution network 180.

A platform 110 may communicate with an e-commerce website hosted on a web server (not shown), a plurality of automated lockers 150 as well as one or more physical retail stores 160 to sell one or more products and services. Customer 130 may place an online order of one or more items at the website of platform 110 for pickup at one of the plurality of automated lockers 150 or at one of the merchant's physical stores 160.

In the example computing environment 100, customer terminal 120 may represent a mobile device such as a smartphone, a tablet computer, a notebook computer, or a desktop computer that is communicatively coupled to network 140 to allow customer 130 to communicate, access information and place orders via platform 110.

Network 140 may include wired and/or wireless networks that enable communications between the various networked devices associated with example computing environment 100, such as customer terminal 120, central server 112, automated locker 150, merchant's physical store 160, retailer outside merchant's platform 170, and distribution network 180.

As shown in FIG. 1, automated locker 150 may be located in parking lots close to merchant's physical stores 160, in the merchant's physical stores 160, local parks or other public places convenient for customers to access.

In the example computing environment 100, platform 110 may include one or more servers, shown and referred to as central server 112 for simplicity, and one or more databases, shown and referred to as a central database 111 herein for simplicity. Central server 112 and central database 111 may be communicatively coupled to receive information and data from network devices via network 140.

Central server 112 may be configured to allow customers to place and pick up an online order of one or more items at automated locker 150 via network 140. Platform 110 may include one or more computing devices for communicating with automated locker 150 via network 140 to execute one or more sets of processes. Customer 130 may communicate with platform 110 via central server 112 and network 140. Database 111 may record, store or otherwise contain therein data associated with a set of products and/or services that are available for sale at an e-commerce website hosted on a web server for pickup at one or more merchant's automated lockers including merchant's physical store 160.

Customer 130 may create, via central server 112 and network 140, an account with platform 110 by creating a customer profile to store personal information and credentials of customer 130 in central database 111. Each customer profile may be configured to store data related to customer 130, The data may include customer's username, password, email address, mobile phone number, shipping (residential) address, customer's preferences, payment transaction accounts, purchasing preferences, search history, purchase history, pending orders, other relevant demographic or analytical data, third parties including family members, friends, or neighbors, etc. Central database 111 may be configured to store profiles of a plurality of customers. Customer's payment transaction accounts may include one or more blockchain payment transaction accounts associated with blockchain payment networks, one or more credit card or debit card accounts associated with corresponding card payment networks, and one or more mobile payment accounts linked with customer's credit card or debit card accounts.

Customer 130 may also request, create or generate one or more tasks, transactions or records with platform 110 via central server 112. A unique Quick Response (QR) code or other type of code may be generated for customer 130 via central server 112. The unique QR code may be read or accessed by computing devices (processors) in the interactive touch screen display interface for retrieving customer's pending orders.

In some example embodiments, central server 112 may monitor and communicate status of automated locker 150. Central server 112 may send out system alerts to a maintenance department when the power supply of automated locker 150 or the communication between automated locker 150 and central server 112 is interrupted.

Distribution network 180 may communicate with automated locker 150, merchant's physical store 160, retailer's outside management system 170, and merchant's inventory (not shown) via network 140 for delivering items to be stocked or ordered items to be picked up at automated locker 150.

Figure 2:
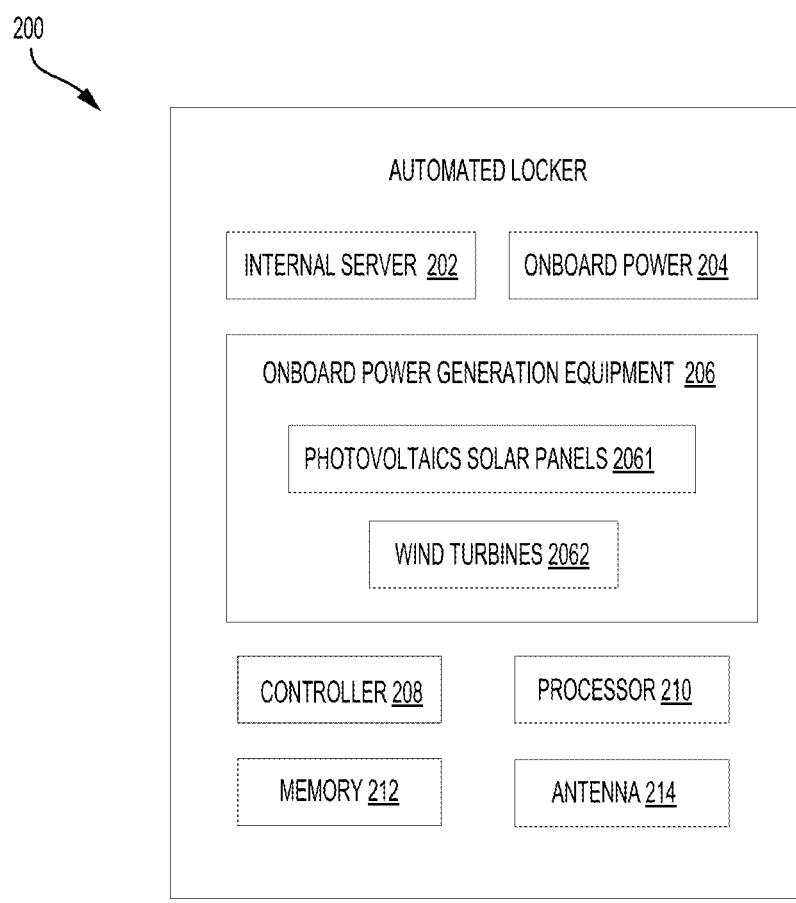
FIG. 2 is a block diagram illustrating an example automated locker in accordance to some example embodiments.

FIG. 2 is a block diagram illustrating an example automated locker 200 in accordance to some example embodiments. Example automated locker 200 is one of some example embodiments based on example computing environment 100, and is provided solely for illustrative purpose so that those skilled in the art may better appreciate benefits and advantages provided by the present disclosure. Therefore, the scope of the present disclosure is not limited to example embodiment 200.

As illustrated in FIG. 2, automated locker 200 may include internal server 202; onboard power 204; onboard power generation equipment 206; controller 208; processor 210; memory 212; antenna 214; and interactive touch screen terminal (not shown).

In some example embodiments, onboard power generation equipment 206 may include a plurality of photovoltaics solar panels 2061, wind turbines 2062 and other types of self-generating power systems. Each type of power generation equipment 206 may be optional, separately detached, modular or otherwise combined in accordance with some example embodiments.

In some example embodiments, automated locker 200 may also include a power supply switch module (not shown) comprising sensors and a power supply switch. The sensors may be configured to detect a primary power line failure and to send a corresponding detected signal to controller 208 to control the power switch. Controller 208 may control the power switch based on the signal. The power supply switch may be configured to conduct switching operations controlled by controller 208 and to switch the power supply between the primary power supply and onboard power 204.

Controller 208 may monitor and detect when a power supply or communication with platform 110 is interrupted and autonomously activate onboard power generation equipment 206 and communication system. In some example embodiments, controller 208 may be configured to detect a position of the power supply switch and to conduct switching operations of between onboard power 204 and the primary power supply.

In some example embodiments, controller 208 may monitor onboard power generation equipment 206 so that onboard power 204 is fully charged by the primary power supply when the primary power supply provides power to automated locker 200.

In an event of a primary power supply failure, controller 208 may immediately control the power switch to onboard power 204 for supplying a battery power to automated locker 200 and request internal server 202 to conduct transactions and store transaction data internally until the primary power supply is reestablished. Controller 208 may control onboard power generation equipment 206 to generate power for continuously charging onboard power 204. Power generation equipment 206 may also be used to provide power for automated locker 200.

In some example embodiments, automated locker 200 further comprises an interactive touch screen terminal comprising a touch screen display interface including a camera, a scanner, and a payment module. The touch screen display interface displays the status of automated locker 200. The touch screen display interface may be configured to read an order confirmation code, a QR code or other codes associated with customer 130. The touch screen display interface may further be configured to communicate with internal server 202, platform 110 and other computing devices via network 140 or a WLAN. For example, upon arriving at automated locker 200, interactive touch screen terminal may quickly scan or read QR code to access customer's account and retrieve a pending order.

In an example embodiment, one or more processors 210 are configured to communicate with central server 112, internal server 202, customer terminal 120, controller 208, touch screen display interface, and memory 212. Processor 210 may be configured to be in communication with memory 212 for implementing stored instructions.

Figure 3:
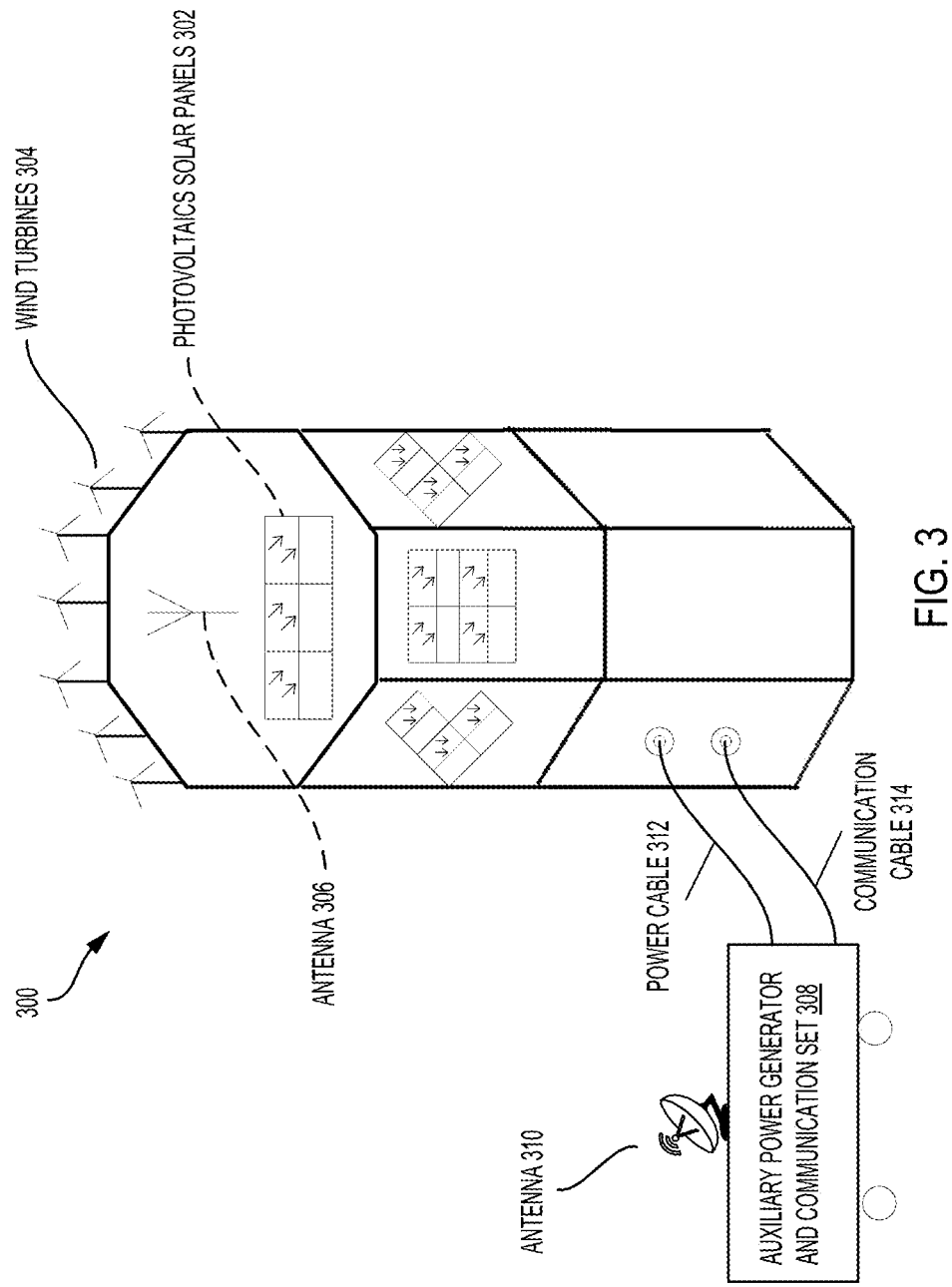
FIG. 3 shows a diagram illustrating another example automated locker in accordance to some example embodiments.

FIG. 3 shows a diagram illustrating another example automated locker 300 in accordance to some example embodiments. Locker 300 may have an onboard power and onboard power generation equipment such as a plurality of photovoltaics solar panels 302, wind turbines 304, or other types of self-generating power systems.

Automated locker 300 may include an on-board battery to receive power from the plurality of photovoltaics solar panels 302. In some example embodiments, the plurality of photovoltaics solar panels 302 may be disposed on a roof and a plurality of upper side walls surrounding locker 300 which are above an item pickup area of locker 300. The onboard power generation equipment may further include solar panel modular connectors to connect the plurality of solar panels 302 to locker 300 for generating a first backup power to charge the onboard power of locker 300.

In some example embodiments, the onboard power generation equipment may include wind turbines 304 installed on the top of the locker 300 for generating a backup power supply for locker 300 and/or charging the onboard power. Alternatively, locker 300 may be provided with a dedicated external auxiliary power generator and communication set 308, which is deployed when the locker power source and communication between locker 300 and central server 112 is interrupted. Locker 300 may send a request to external auxiliary energy generator and communication set 308 autonomously when power and communication are interrupted.

As shown in FIG. 3, locker 300 may include antenna 306 coupled to locker 300 and installed on top of the locker roof for communicating with a nearby wireless local area network, cellular network, or other type of network.

In some example embodiments, locker 300 may be provided with dedicated external auxiliary generator and communication set 308, which is activated when the primary power supply or a communication between central server 112 and locker 300 is interrupted. Locker 300 may include a communication port and a power connection port for connecting to a power generation and a communication of external auxiliary power generator and communication set 308 via a power supply cable 312 and a communication cable 314, respectively. External auxiliary generator and communication set 308 may include antenna 310 for communication. In some example embodiments, antenna 310 may be directly coupled to locker 300 and be configured to communicate with a wireless network through wireless connections installed in locker 300. In some example embodiments, dedicated external auxiliary generator and communication set 308 may be deployed to locker 300 when an event of the power supply interruption or communication disconnection is anticipated at locker 300. Dedicated external auxiliary generator and communication set 308 may have modular connectors compatible with all components illustrated in FIG. 3.

In some example embodiments, internal server 202 may be controlled by the processor to automatically connect to a wireless network via antenna 306 or antenna 310. Antenna 306 or antenna 310 may be one or more of WI-FI antennas and cellular antennas, or other type of network devices to communicate with a wireless local area network, cellular network, or other type of wired and/or wireless networks.

Figure 4:
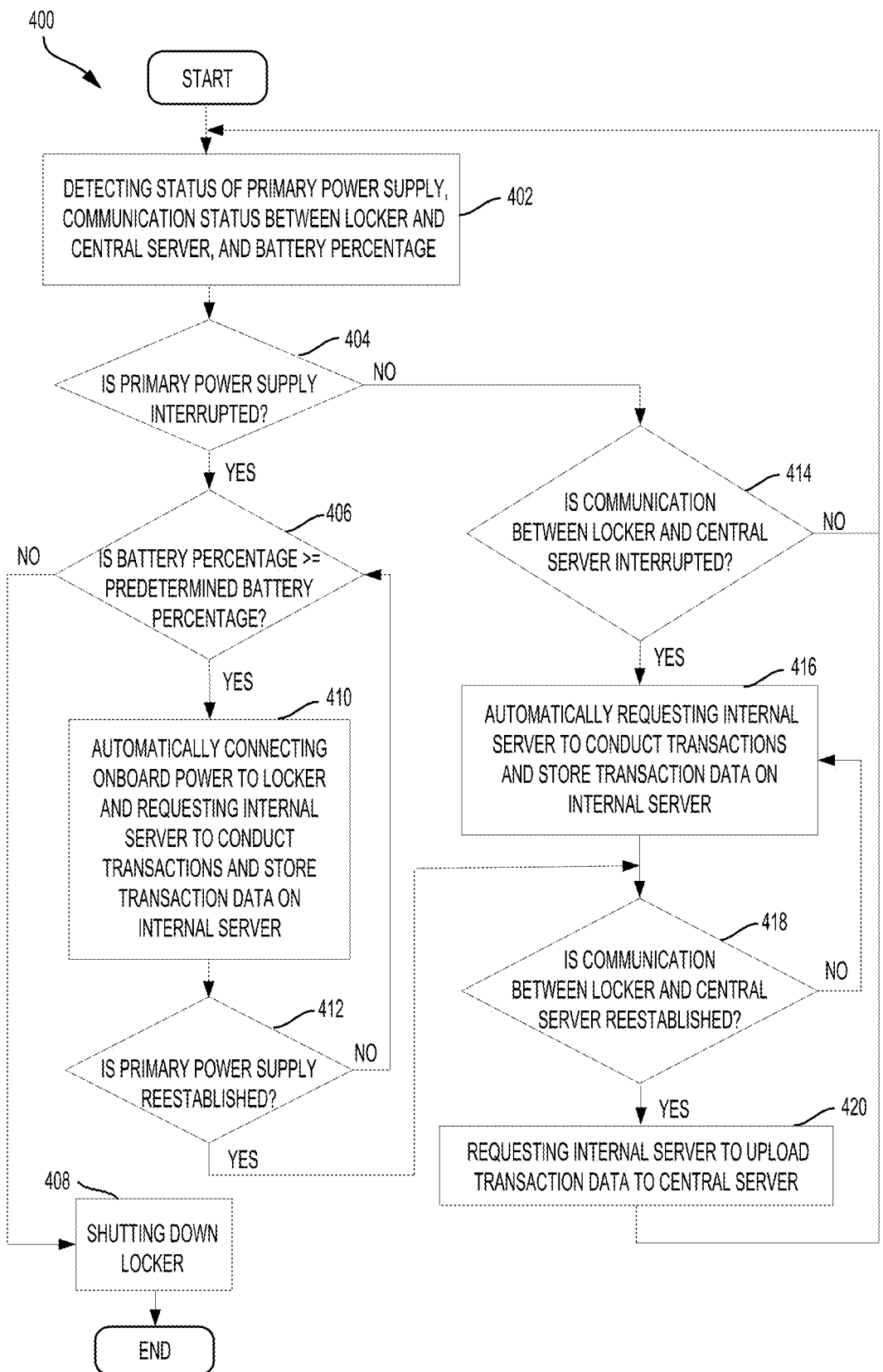
FIG. 4 is a flowchart diagram illustrating an example process for controlling onboard power and communication systems at an automated locker in accordance to some example embodiments.

FIG. 4 is a flowchart diagram illustrating an example process 400 for controlling onboard power and communication system in accordance to some example embodiments. The method 400 may be implemented in the above described systems and may include the following steps. Steps may be omitted or combined depending on the status of the locker and the operations being performed.

In step 402, the controller may autonomously detect one or more of: a status of a primary power supply connected to the locker, a communication status between the locker and a central server, a status of the internal server, and a battery percentage of the onboard power. The controller may continuously monitor the battery percentage of the onboard power and control charging so that the onboard power is fully charged by the primary supply.

In step 404, the controller may determine whether the primary power supply is interrupted.

In step 406, when the primary power supply is determined to be interrupted, the processor may compare the battery percentage of the onboard power with a predetermined percentage.

In step 408, when the battery percentage of the onboard power is detected to be lower than the predetermined battery percentage, the controller may autonomously perform an operation to shut down the locker. For example, a predetermined percentage may be predetermined to be 10% by the platform. When the controller detects the battery percentage of the onboard power to be 10% or lower, the controller may issue commands to secure and shut down the locker.

In some example embodiments, the platform may use a predetermined battery percentage (e.g., 40%) to shut down some functions of the locker to conserve the battery power in order to keep the internal server or other selected components operating. In some embodiments, the controller may be set up to automatically shut down the locker a few hours after the primary power supply is interrupted. For example, the processor may request the controller to shut down the locker after 4 hours when the primary power supply is interrupted even though the battery power exceeds the threshold.

In step 410, when the battery percentage of the onboard power is detected to be greater than or equal to the predetermined battery percentage, the controller may autonomously switch the power supply to the onboard power for supplying a battery power to the locker and request the internal server to conduct transactions and to store transaction data internally until the primary power supply is reestablished. At the same time, the controller may control onboard power generation equipment to generate power for continuously charging the onboard power or to provide power to various components in the locker. For example, the controller may control solar panel modular connectors to connect the plurality of solar panels to locker for generating a first backup power to charge the onboard power. In an event of a primary power supply failure, the controller may conduct the operation 410 so that the locker experiences a smooth power transfer to the onboard power. In some example embodiments, the communication connection between the locker and the central server may also be detected simultaneously.

In step 412, the controller may detect whether the primary power supply is reestablished. If the primary power supply is not reestablished, the controller may continuously detect the battery percentage of the onboard power (406).

In step 414, the controller may detect whether the communication connection between the locker and the central server is interrupted.

In step 416, when the primary power supply is supplying power and the communication between the locker and the central server is discontinued, the processor may autonomously request the internal server to conduct the transactions and store the transaction data until the communication is reestablished.

In step 418, the controller may detect whether both the primary power supply and the communication between the locker and the central server are reestablished. In some example embodiments, the controller may detect whether either of or both the primary power supply and the communication between the locker and the central server are reestablished.

In step 420, when the primary power supply is detected to be reestablished and the locker is communicating with the central server, the processor may autonomously request the internal server to upload the stored transaction data to the central server.

In some example embodiments, the steps in example process 400 may be implemented independently or in different orders or patterns. For example, when the power supply interruption is detected while the central server is still communicating with the locker, the steps of 406, 408, 410, 412, 418, and 420 may be conducted. When a communication disconnection between the locker and the central server is detected while power is supplied by the primary power supply, the steps of 414, 416, 418, and 420 in example process 400 may be conducted.

Figure 5:
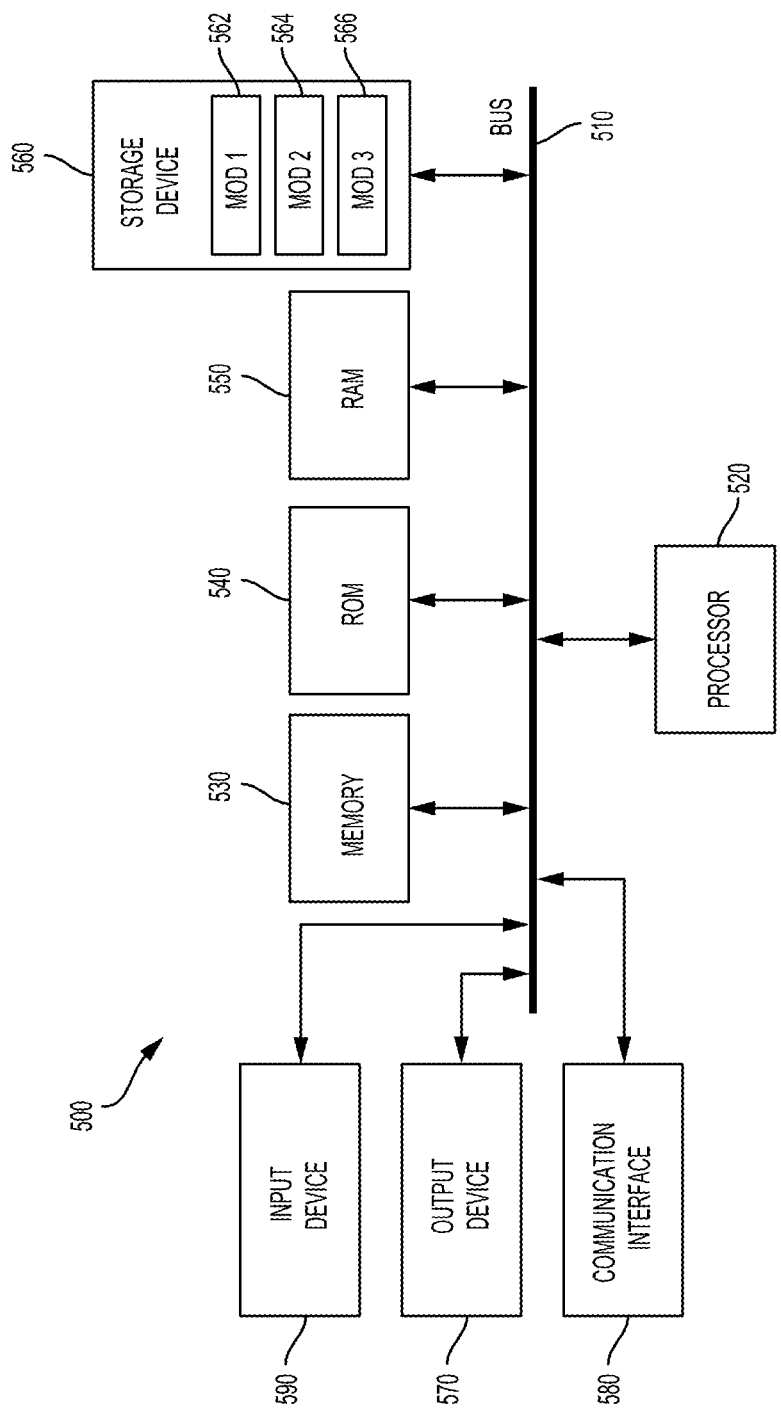
FIG. 5 is a block diagram illustrating an example computer system in which some example embodiments may be implemented.

FIG. 5 illustrates an example computer system 500 which can be used to perform the processes for storing items in customer owned product storages at an automated locker as disclosed herein. With reference to FIG. 5, an example system 500 can include a processing unit (CPU or processor) 520 and a system bus 510 that couples various system components including the system memory 530 such as read only memory (ROM) 540 and random access memory (RAM) 550 to the processor 520. The system 500 can include a cache of high speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, output device 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. An automated locker, comprising:
   an internal server;
   an onboard power source;
   an onboard power generation equipment connected to a body of the locker via a modular connection, and configured to generate a first backup power for charging the onboard power source;
   a controller;
   a processor; and
   a non-transitory computer-readable storage medium having instructions stored which, when executed by the processor, cause the processor to perform operations comprising:
      autonomously detecting, by the controller, a status of: a primary power supply providing power to the locker, a communication connection between the locker and a central server, the internal server, and a battery percentage of the onboard power source;
      comparing, by the processor, the battery percentage of the onboard power source with a predetermined percentage when the primary power supply is detected to be interrupted;
      autonomously switching, by the controller, to the onboard power source for supplying a battery power to the locker when the primary power supply is detected by the controller to be interrupted and when the battery percentage of the onboard power source is greater than or equal to a predetermined battery percentage;
      requesting, by the processor, the internal server to conduct transactions and store transaction data on the internal server when the communication connection between the locker and the central server is interrupted and when the primary power supply is detected to be interrupted;

autonomously controlling, by the controller, the onboard power generation equipment to generate power for charging the onboard power source;

autonomously shutting down the locker, by the controller, when the primary power is detected to be interrupted and when the battery percentage of the onboard power source is lower than the predetermined battery percentage; and autonomously requesting, by the processor, the internal server to upload the stored transaction data to the central server when the primary power supply is detected to be reestablished and the locker is in communication with the central server.

2. The system of claim 1, wherein the operations further comprise:

autonomously requesting, by the processor, the internal server to conduct the transactions and store the transaction data internally, when the connection between the locker and the central server is interrupted.

3. The system of claim 1, wherein the onboard power generation equipment further comprises solar panel modular connectors to connect a plurality of photovoltaics solar panels to the locker for charging the onboard power source, wherein the plurality of photovoltaics solar panels are disposed on a roof of the locker and on a plurality of upper side walls surrounding the locker.

4. The system of claim 1, the automated locker further comprising an external auxiliary power generator and communication set, wherein:

when a communication between the central server and the locker is interrupted, a communication system of the external auxiliary power generator and communication set is connected to a communication port of the locker via a communication cable; and when the primary power supply to the locker is interrupted, a power of the external auxiliary power generator and communication set is connecting to a power connection port of the locker via a power supply cable for receiving a supplemental power supply.

5. The system of claim 1, wherein the automated locker further comprises:

sensors configured to detect a primary power supply failure and to transfer a corresponding detected signal to the controller; and a power supply switch configured to conduct switching operations controlled by the controller and to switch the power supply between the primary power supply and the onboard power source.

6. The system of claim 1, wherein the controller is configured to detect a position of the power supply switch and to conduct operations of the power supply switch, and the controller monitors the battery percentage of the onboard power source and controls charging the onboard power source so that the onboard power source is charged by the primary power supply.

7. The system of claim 1, the automated locker further comprises:

an antenna configured to be coupled to the locker and to communicate with a wireless local area network, cellular network, or other type of network.

8. The system of claim 4, wherein the external auxiliary generator and communication set further comprises a cellular antenna for communication through wireless connections installed in the locker when the locker communication is not connected to a power grid.

9. The system of claim 1, wherein the onboard power generation equipment further comprises wind turbines installed on the top of the locker.

10. A method comprising:

autonomously detecting, by a controller, a status of a primary power supply connected to a locker, a communication status between the locker and a central server, a status of an internal server, and a battery percentage of an onboard power;

when the primary power supply is detected to be interrupted, comparing, by a processor, the battery percentage of the onboard power with a predetermined percentage;

when the battery percentage of the onboard power is greater than or equal to a predetermined battery percentage, autonomously switching, by the controller, to the onboard power for supplying a battery power to the locker;

requesting, by the processor, the internal server to conduct transactions and store transaction data internally on the internal server when the communication connection between the locker and the central server is interrupted;

autonomously controlling, by the controller, an onboard power generation equipment to generate a power for charging the onboard power;

when the battery percentage of the onboard power is lower than the predetermined battery percentage, autonomously shutting down the locker by the controller; and when the primary power supply is detected to be reestablished and the locker is in communication with the central server, autonomously requesting, by the processor, the internal server to upload the stored transaction data to the central server.

11. The method of claim 10, further comprising:

when a connection between the locker and the central server is discontinued, autonomously requesting, by the processor, the internal server to conduct the transactions and store the transaction data internally.

12. The method of claim 10, wherein further comprising:

connecting a power convertor of the onboard power generation equipment to a plurality of photovoltaics solar panels using solar panel modular connectors; and charging the onboard power via the plurality of solar panels, wherein the plurality of photovoltaics solar panels are disposed on a roof of the locker and on a plurality of upper side walls surrounding the locker.

13. The method of claim 10, further comprising:

when the primary power supply to the locker is interrupted, connecting, via a communication cable, a communication of an external auxiliary power generator and communication set to a communication port of the locker; and when a communication between the central server and the locker is interrupted, connecting, via a power supply cable, a power of the external auxiliary power generator and communication set to a power connection port of the locker for receiving a supplemental power supply.

14. The method of claim 10, wherein the switching the primary power supply to the onboard power comprises:

detecting a primary power supply failure by sensors; and transferring a corresponding detected signal to the controller; and detecting, by the controller, a position of a power supply switch.

15. The method of claim 10, further comprising:
monitoring the battery percentage of the onboard power source and controlling charging the onboard power source, by the controller, so that the onboard power source is charged by the primary power supply.

16. The method of claim 10, further comprising:
coupling an antenna to the locker; and
communicating, via the antenna, with a wireless local area network through wireless connections installed in the locker.

17. The method of claim 13, wherein the external auxiliary generator and communication set further comprises a cellular antenna for communication through the wireless connections installed in the locker when the locker communication is not connected to a power grid.

18. The method of claim 10, wherein the onboard power generation equipment further comprises wind turbines installed on the top of the locker.

19. A non-transitory computer-readable storage medium having executed instructions stored which, when executed by a processor, cause the processor to perform operations comprising:

autonomously detecting, by a controller, a status of a primary power supply connected to a locker, a communication status between the locker and a central server, a status of an internal server, and a battery percentage of an onboard power;

when the primary power supply is detected to be interrupted, comparing, by the processor, the battery percentage of the onboard power with a predetermined percentage;

when the battery percentage of the onboard power is greater than or equal to a predetermined battery percentage, autonomously switching, by the controller, to the onboard power for supplying a battery power to the locker;

requesting, by the processor, the internal server to conduct transactions and store transaction data internally on the internal server when the communication connection between the locker and the central server is interrupted;

autonomously controlling, by the controller, the onboard power generation equipment to generate a power for charging the onboard power;

when the battery percentage of the onboard power is lower than the predetermined battery percentage, autonomously shutting down the locker by the controller; and when the primary power supply is detected to be reestablished and the locker is in communication with the central server, autonomously requesting, by the processor, the internal server to upload the stored transaction data to the central server.

20. The non-transitory computer-readable storage medium of claim 19, wherein the operations further comprise:

when the connection between the locker and the central server is discontinued, autonomously requesting, by the processor, the internal server to conduct the transactions and store the transaction data internally.

\* \* \* \* \*